United States Patent
Ozaki

(10) Patent No.: US 7,609,720 B2
(45) Date of Patent: Oct. 27, 2009

(54) EQUIPMENT AND METHOD FOR BAND ALLOCATION

(75) Inventor: Hirokazu Ozaki, Tokyo (JP)

(73) Assignee: NEC Corporation (JP)

( * ) Notice: Subject to any disclaimer, the term of this patent is extended or adjusted under 35 U.S.C. 154(b) by 475 days.

(21) Appl. No.: 11/560,665

(22) Filed: Nov. 16, 2006

(65) Prior Publication Data

US 2007/0110099 A1 May 17, 2007

(30) Foreign Application Priority Data

Nov. 17, 2005 (JP) ............................. 2005-333172

(51) Int. Cl.
*H04J 3/16* (2006.01)

(52) U.S. Cl. ..................................... 370/468

(58) Field of Classification Search ................. 370/468, 370/230, 278, 282, 222, 235, 516, 329, 390, 370/397, 401, 412, 470, 471, 907, 395.4, 370/395.42, 395.43

See application file for complete search history.

(56) References Cited

U.S. PATENT DOCUMENTS

| | | | |
|---|---|---|---|
| 6,816,494 B1 | 11/2004 | Raza | |
| 7,317,688 B2 * | 1/2008 | Mukai et al. | 370/236 |
| 7,403,477 B2 * | 7/2008 | Takeuchi et al. | 370/230 |
| 2003/0163593 A1 | 8/2003 | Knightly | |
| 2004/0095884 A1 | 5/2004 | Lee et al. | |

FOREIGN PATENT DOCUMENTS

EP 1 333 623 8/2003

OTHER PUBLICATIONS

European Search Report issued Mar. 5, 2007 in connection with the corresponding European Patent Application No. 06 12 4211.
Bandwidth allocation for multiservice access on EPONs IEEE Optical Communications Feb 2005.

* cited by examiner

*Primary Examiner*—Chi H Pham
*Assistant Examiner*—Alexander Boakye
(74) *Attorney, Agent, or Firm*—Ostrolenk Faber LLP

(57) ABSTRACT

A bandwidth allocation equipment in an optical line terminal, which allocates bandwidth for data to be transmitted from optical network units through an optical splitter, includes a transmit/receive unit and bandwidth allocation units. The transmit/receive unit receives an output request for requesting bandwidth allocation, and sends back a signal sending permission to the respective optical network units for specifying bandwidth to be allowed for transmitting the data in each service cycle. The bandwidth allocation units are connected to one another in a ring. Each bandwidth allocation unit is provided with corresponding to the optical network unit, and outputs the signal sending permission from the bandwidth allocation unit that has performed the last bandwidth allocation processing in the ring connection. The transmit/receive unit specifies the bandwidth allocation unit that performs the first bandwidth allocation processing by shifting one by one for each of the service cycles.

13 Claims, 15 Drawing Sheets

EQUIPMENT AND METHOD FOR BAND ALLOCATION

BACKGROUND OF THE INVENTION

1. Field of the Invention

The present invention relates to an equipment and a method for bandwidth allocation at an optical line terminal in the Passive Optical Network.

2. Description of the Related Art

The Internet is rapidly spreading and developing. Accordingly, large amount of data such as image data or video data is often communicated, raising an important issue of improving a communication line to a broadband to allow wideband access to the Internet. As a broadband access line, various types of technology have been put into practical use such as ADSL (Asymmetric Digital Subscriber Line) using existing telephone lines, or a cable modem using a coaxial line of CATV (Cable TeleVision) as a network line. However, for realization of high-speed and high-quality communication environment, it is desired that a communication line is further improved to a wideband. In such status, a PON (Passive Optical Network) as a network using optical fiber is getting attention.

FIG. 11 illustrates a PON configuration and downstream frame transmission. The PON includes an OLT (Optical Line Terminal) 101 located in a station (not shown), first to Nth ONUs (Optical Network Units) $102_1$-$102_N$ located in respective end users' homes and an optical splitter 103 that splits or joins signals among the ONUs. Each personal computer (not shown) in the end user's home connects to the network via any of the ONUs $102_1$-$102_N$, the optical splitter 103 and the OLT 101.

In the above PON, upstream and downstream signals are wavelength-multiplexed into single, bi-directional optical fiber for transmission. For example, the wavelength of an upstream signal is 1.3 μm in many cases, while the wavelength of a downstream signal is 1.5 μm. As illustrated in FIG. 11, a downstream signal is broadcast from the OLT 101 to all ONUs $102_1$-$102_N$. The broadcast means simultaneous transmission to all nodes in the same segment. In this case, the first to Nth ONUs $102_1$-$102_N$ check destinations of transmitted frames and capture frames only addressed to themselves.

For example, assume that the OLT 101 transmits frames $111_1$, $111_2$, $111_3$ and $111_4$ having destination $A_2$, $A_1$, $A_N$ and $A_1$, respectively in that order. In this case, the optical splitter 103 simply splits and transmits the frames $111_1$, $111_2$, $111_3$ and $111_4$ to all ONUs $102_1$-$102_N$ in that order. Assume that a destination to the first ONU $102_1$ is $A_1$, a destination to the second ONU $102_2$ is $A_2$, and a destination to the Nth ONU $102_N$ is $A_N$. In this case, the second ONU $102_2$ first captures the frame $111_1$ having the destination $A_2$. Next, the first ONU $102_1$ captures the frame $111_2$ having the destination $A_1$. Then, the Nth ONU $102_N$ captures the frame $111_3$ having the destination $A_N$. Finally, the first ONU $102_1$ captures the frame $111_4$ having the destination $A_1$.

FIG. 12 illustrates upstream frame transmission in a PON identical to that of FIG. 11 in configuration. Upstream frames transmitted from the first to Nth ONUs $102_1$-$102_N$ join at the optical splitter 103. At the optical splitter 103, it is necessary to avoid a temporal overlap of frames and collision of signals. For this necessity, time division multiplexing communication is performed for the frames sent from the first to Nth ONUs $102_1$-$102_N$ not to overlap. In the time division multiplexing communication, the OLT 101 coordinates an output request (REPORT) reported from the first to Nth ONUs $102_1$-$102_N$. OLT 101 calculates transmission time based on distances between the OLT 101 and each of the first to Nth ONUs $102_1$-$102_N$. Then, OLT 101 grants signal sending permissions (GATEs) that specify transmission timing to some of the first to Nth ONUs $102_1$-$102_N$ that have reported the output requests.

Each of the output requests (REPORTs) reported by the first to Nth ONUs $102_1$-$102_N$ includes the state of a queue, i.e. the length of the queue in a buffer memory (not shown) for storing signals to be transmitted for information. According to the length of a frame, the OLT 101 can specify the timing to permit transmission of the frame. A signal sending permission (GATE) output by the OLT 101 includes the time to start sending and the time period to continue sending that depend on the priority of a frame subjected to an output request (REPORT).

Some of the first to Nth ONUs $102_1$-$102_N$ that have performed output requests (REPORTs) (hereinafter called "ONUs $102_{REP}$") send upstream signals according to signal sending permissions (GATEs) sent to them. In other words, bandwidth allocation for the upstream signals from each ONU $102_{REP}$ is accomplished as allocation of a time slot for upstream signal transmission.

FIG. 13 illustrates a conventional exchange of the above described output request (REPORT) and of the signal sending permission (GATE) to it. In this diagram, the signal exchange between the OLT 101 and the single ONU $102_{REP}$ is illustrated using a time axis (time) as the axis of abscissas. First, the ONU $102_{REP}$ sends an output request $R_1$ at time $t_1$ on the occurrence of a signal to be transmitted. When the OLT 101 receives the request, it sends back a signal sending permission $G_1$ and the ONU $102_{REP}$ receives the permission at time $t_2$. The ONU $102_{REP}$ starts sending data $D_1$ in a predetermined time slot $TS_1$ at time $t_3$. A period between the time $t_1$ and the time $t_3$ is waiting time $W_1$. The time when the sending of the data $D_1$ completes is time $t_4$.

The ONU $102_{REP}$ sends a second output request $R_2$ at time $t_5$ after the time $t_4$. The OLT 101 sends back a signal sending permission $G_2$ and the ONU $102_{REP}$ receives the permission at time $t_6$. The ONU $102_{REP}$ starts sending data $D_2$ in a predetermined time slot $TS_2$ at time $t_7$ after waiting time $W_2$. The time when the sending of the data $D_2$ completes is time $t_8$. The data $D_1$, $D_2$ . . . are transmitted by repeating the above processing.

Each of the output requests $R_2$, $R_3$, . . . following to the first request $R_1$ can be transmitted piggyback at the ends of the data $D_1$, $D_2$, . . . that are previously sent, respectively. For example, if the second output request $R_2$ is ready to be output at the time $t_4$, the request $R_2$ can be transmitted without waiting till the time $t_5$. In this case, the time $t_5$ is identical to the time $t_4$.

Next, communication between the ONUs $102_1$, $102_2$, . . . , $102_N$ and the OLT 101 shown in FIG. 11 is described with reference to FIG. 14. A cycle that transmission of upstream signal transmitted from ONU to OLT makes a circuit of all ONUs $102_1$-$102_N$ is referred to as a Service Cycle (SC). Assume that N equals three. FIG. 14 shows contents of an Mth service cycle $SC_M$ and the next (M+1)th service cycle $SC_{M+1}$ in detail. Usually, the length of a service cycle SC does not need to be always constant, but may change dynamically depending on the status of output requests by the respective ONUs $102_1$-$102_N$.

An Ethernet (R) PON for transmitting Ethernet packets via a PON is standardized according to the IEEE (The Institute of Electrical and Electronics Engineers, Inc.) 802.3ah. The IEEE 802.3ah defines frame formats for an output request (REPORT) message and a signal sending permission (GATE) message. However, since it does not define an upstream bandwidth allocation method or algorithm, these can be defined in equipment design as necessary.

In the Mth service cycle $SC_M$ shown in FIG. 14, EF (Expedited Forwarding) data (DATA) of a class for guaranteeing a delay and a bandwidth is transmitted first, as described below. Then, the data $D_1$ of the first ONU $102_1$ is transmitted to the OLT 101, and the data $D_2$ of the second ONU $102_2$ is transmitted to the OLT 101 in the next time slot. Finally, the data $D_N$ of the Nth ONU $102_N$ is transmitted to the OLT 101. In this way, when the last data $D_N$ in the Mth service cycle $SC_M$ is transmitted to the OLT 101, traffic allocation $AL_M$ in the next service cycle is performed. In the (M+1)th service cycle $SC_{M+1}$, the data $D_1$ of the first ONU $102_1$ is similarly transmitted to the OLT 101 after the EF data, and the data $D_2$ of the second ONU $102_2$ is transmitted to the OLT 101 in the next time slot. Finally, the data $D_N$ of the Nth ONU $102_N$ is transmitted to the OLT 101. In the last interval in the (M+1)th service cycle $SC_{M+1}$, traffic allocation $AL_{M+1}$ in the next service cycle is performed. Subsequent allocations are performed in the same way as above.

Now, traffic classification is described. The traffic classification is performed for upstream signals to transmit frames corresponding to a plurality of services according to priorities. Each class has a corresponding priority. For example, in the DiffServe (Differentiated Services) of the IETF (The Internet Engineering Task Force), in addition to the EF shown in FIG. 14, classes of AF (Assured Forwarding) and BE (Best Effort) are defined. The EF is a class for guaranteeing a delay and bandwidth and of the highest priority. The AF is a class for not guaranteeing a delay but guaranteeing a bandwidth. The BE is a class for not guaranteeing a delay or a bandwidth and of the lowest priority. Representative service applications of the EF, AF, and BE classes include VoIP (Voice over IP), file transfer and usual Internet access, respectively.

There are several algorithms for bandwidth allocation. There is an algorithm called D1 for the PON (for example, see Y. Luo et al., "Bandwidth Allocation for Multiservice Access on EPONs," IEEE Communications Magazine 2005 February s16-s21) The D1 algorithm determines in advance a maximum value of a service cycle SC and allocates a bandwidth so as not to exceed the maximum value. First, the EF, a class for guaranteeing both a delay and a bandwidth in an output request (REPORT) by each of the ONU $102_1$, the ONU $102_2$ and the ONU $102_N$ is assigned a fixed bandwidth. The remaining bandwidth is allocated to the AF data, a class for not guaranteeing a delay but guaranteeing a bandwidth in an output request (REPORT) by each of the ONU $102_1$, the ONU $102_2$ and the ONU $102_N$. In this allocation, if a total sum of requested AF data is equal to or less than the remaining bandwidth of a service cycle after allocating the EF data, all the requested AF data are assigned.

After the AF data is assigned, if further bandwidth remains in the service cycle SC, the BE data, a class for not guaranteeing a delay or a bandwidth in the output request is allocated. If a total sum of the requested AF data exceeds the remaining bandwidth after the EF data is assigned, the ONUs 102 that requested the AF data transmission are equally assigned the AF data. The BE data is not assigned since the remaining bandwidth is depleted by the ONU 102.

The bandwidth calculation and allocation are performed after the output requests (REPORTs) are notified from all the ONUs $102_1$-$102_N$ to the OLT 101. Based on the bandwidth calculation and allocation, the OLT sends a signal sending permission (GATE) to the relevant ONUs 102.

FIG. 15 illustrates a configuration of bandwidth allocation control unit used in a conventional OLT. A bandwidth allocation control unit 121 includes an allocation module 122 that allocates bandwidth and an interface module 125. The interface module 125 receives output requests (REPORTs) $123_1$-$123_N$ and transmits signal sending permissions (GATEs) $124_1$-$124_N$ from/to the first to Nth ONUs $102_1$-$102_N$. The interface module 125 receives the state of a buffer memory for storing signals to be transmitted by the first to Nth ONUs $102_1$-$102_N$, as output requests $123_1$-$123_N$ respectively. When the allocation module 122 has allocated bandwidth, the interface module 125 transmits the result as the signal sending permissions $124_1$-$124_N$ to the ONUs $102_1$-$102_N$, respectively. The allocation module 122 performs the allocation according to the above described D1 algorithm. The interface module 125 notifies the allocation module 122 of queue state signals 126 indicating the states of queues in buffer memories in the first to Nth ONUs $102_1$-$102_N$, i.e. queue lengths. The interface module receives allocation complete signals 127 corresponding to the notification and sends the signal sending permissions $124_1$-$124_N$.

Since the D1 algorithm is relatively simple, D1 is easily implemented in a small-scale PON. Bandwidth is allocated evenly among the ONUs $102_1$-$102_N$.

However, the conventional algorithm has a problem of system scalability. That is, in this algorithm, after the output requests $123_1$-$123_N$ are collected from the first to Nth ONUs $102_1$-$102_N$, the allocation is performed intensively till the next service cycle SC starts. Accordingly, if the number of ONUs 102 increases, the allocation module 122 is assigned excessive loads. By this reason, in a large-scale PON, the bandwidth allocation control unit 121 needs an expensive and high-speed integrated circuit or a CPU, which raises the cost of a system. Additionally, if sufficient time is allowed for the bandwidth allocation to solve this problem, starting time of the service cycle SC delays and bandwidth is wasted. As a result, there is a problem that the bandwidth allocation is constrained particularly for the AF data and BE data classes and system performance degrades.

An object of the present invention is to provide an equipment and a method for bandwidth allocation in an optical line terminal that can allocate bandwidth evenly among respective ONUs constituting a PON and does not cause a decrease of bandwidth efficiency for a large number of ONUs.

SUMMARY OF THE INVENTION

According to an aspect of the present invention, a bandwidth allocation equipment in an optical line terminal which allocates bandwidth for data to be transmitted from a plurality of optical network units through an optical splitter, said equipment includes: a transmit/receive unit that receives an output request for requesting bandwidth allocation to the data from the respective optical network units, and sends back a signal sending permission to the respective optical network units for specifying bandwidth to be allowed for transmitting the data in each service cycle as a unit period for the data transmission; and a plurality of bandwidth allocation units, each bandwidth allocation unit is provided with corresponding to the optical network unit for performing bandwidth allocation processing in accordance with the output request for the data to be transmitted from the corresponding optical network unit, and each of bandwidth allocation units are connected to one another in a ring to perform the bandwidth allocation processing one by one for corresponding optical network unit, and outputs the signal sending permission to the transmit/receive unit from the bandwidth allocation unit that has performed the last bandwidth allocation processing in the ring connection. Said transmit/receive unit specifies the bandwidth allocation unit that performs the first bandwidth allocation processing by shifting the bandwidth allocation unit one by one for each of the service cycles.

The present invention relates to a bandwidth allocation equipment that allocates bandwidth for data sent from each Optical Network Unit (ONU) to the Optical Line Terminal (OLT) through the optical splitter in consideration to the priorities. The bandwidth allocation equipment comprises a transmit/receive unit for communicating with each optical network unit, and receives an output request as a data transmission request from each optical network unit. The bandwidth allocation equipment sends back transmittable data types in a service cycle as a unit period for the data transmission and bandwidth to be allocated to the data as a signal sending permission to each optical network unit. The output request decides time-divisioned bandwidth allocation in the service cycle as the unit period wherein each optical network unit transmits data to the optical line terminal. If data transmission beyond the Maximum of Service Cycle is requested, bandwidth allocated to each of the optical network units must be controlled. In the present invention, an ONU (Optical Network Unit) bandwidth allocation unit provided for each of the optical network units allocates bandwidth depending on the priorities. The ONU bandwidth allocation units are located in a ring, and even processing is possible by shifting ONU bandwidth allocation units that allocates bandwidth for each service cycle. Even if there are many optical network units, rapid processing is possible since each ONU bandwidth allocation unit can only control bandwidth allocation for the optical network unit assigned to it. As a result, the bandwidth allocation control is sped up, causing no decrease in bandwidth efficiency.

As described above, according to the present invention, the ONU bandwidth allocation unit is provided to send data from each optical network unit to the optical line terminal through the optical splitter. With the bandwidth allocation unit, bandwidth allocation can be processed depending on the status of respective optical network units. If the optical network units increase, the ONU bandwidth allocation units can increase accordingly, therefore there is no redundancy in a configuration of a communication system. If there is a plurality of ONU bandwidth allocation units and some of them suffer problems, other optical network units can substitute for the processing, so that reliability of the communication system improves.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

The present invention will be described in detail in the following embodiment.

Embodiment 1

Figure 1:
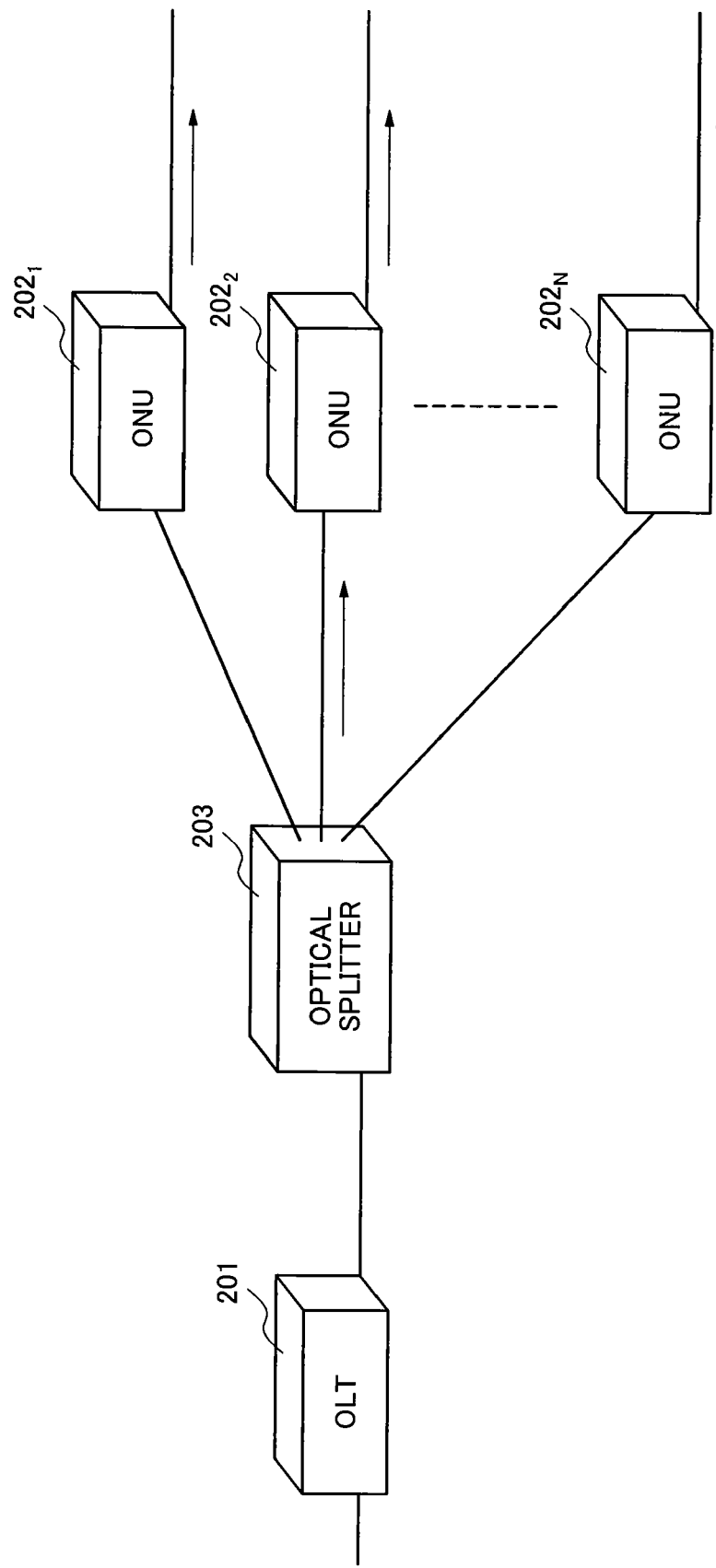
FIG. 1 is a system configuration illustrating an overview of a PON in one embodiment of the present invention.
Figure 11:
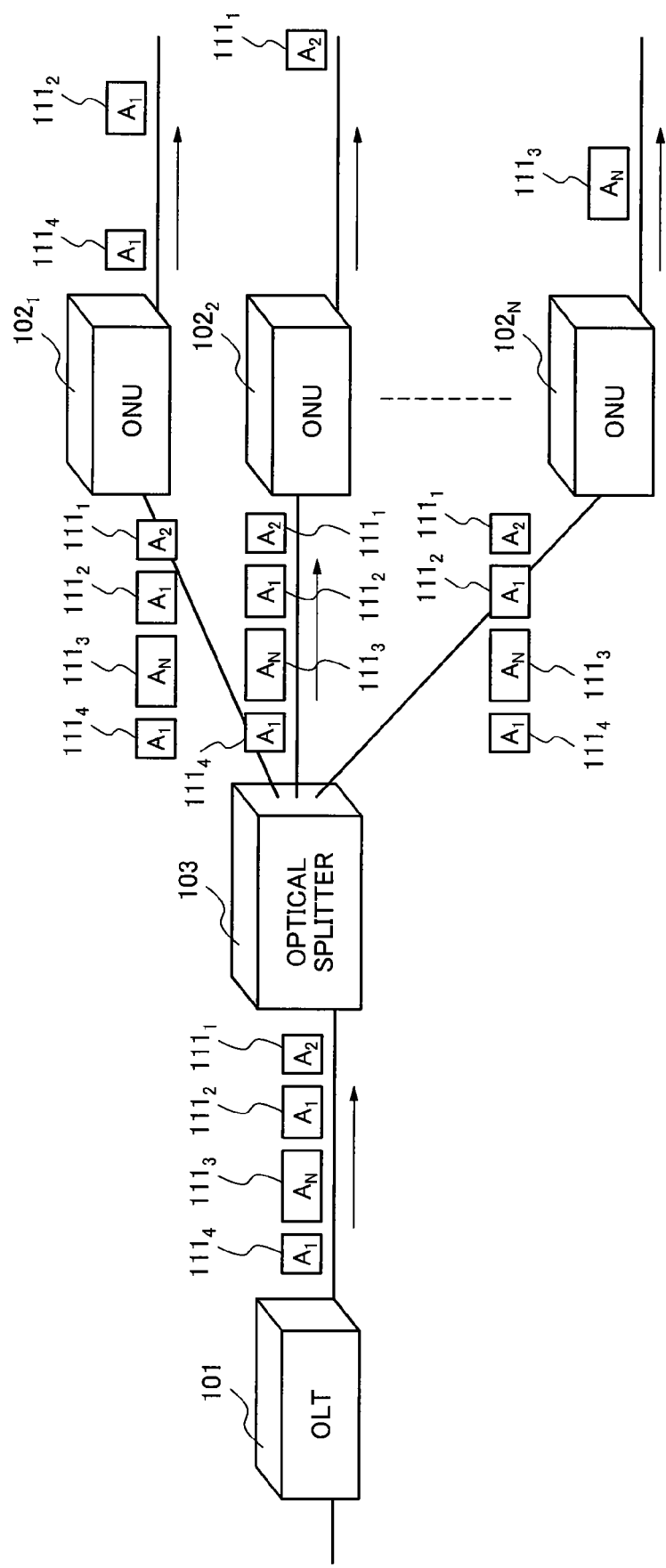
FIG. 11 is a diagram illustrating a PON configuration and downstream frame transmission.
Figure 15:
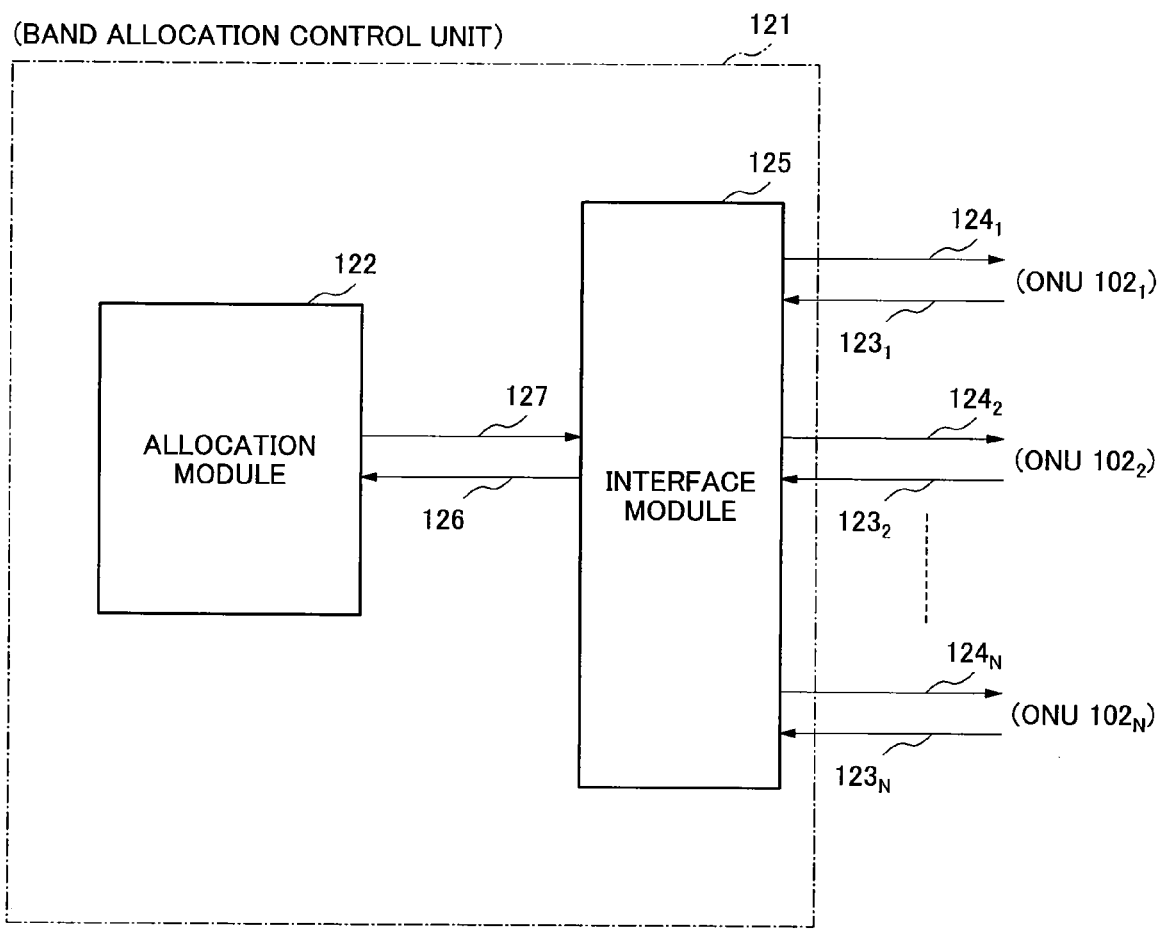
FIG. 15 is a block diagram illustrating a configuration of bandwidth allocation control unit used in a conventional OLT.

FIG. 1 illustrates an overview of a PON in one embodiment of the present invention. An OLT 201 in the present embodiment connects to first to Nth ONUs $202_1$-$202_N$ located correspondingly to end users' homes respectively via an optical splitter 203. The OLT 201 connects to a communication network (not shown) such as the Internet. The first to Nth ONUs $202_1$-$202_N$ connect to communication terminals such as personal computers (not shown). The first to Nth ONUs $202_1$-$202_N$ and the optical splitter 203 have substantially identical configurations to those of the first to Nth ONUs $102_1$-$102_N$ and the optical splitter 103 shown in FIG. 11. These configurations are not further described herein. In the present embodiment, a bandwidth allocation control unit of the OLT 201 differs from the bandwidth allocation control unit 121 shown in FIG. 15. Other components of the OLT 201 are substantially identical to those of the OLT 101 shown in FIG. 11.

Figure 2:
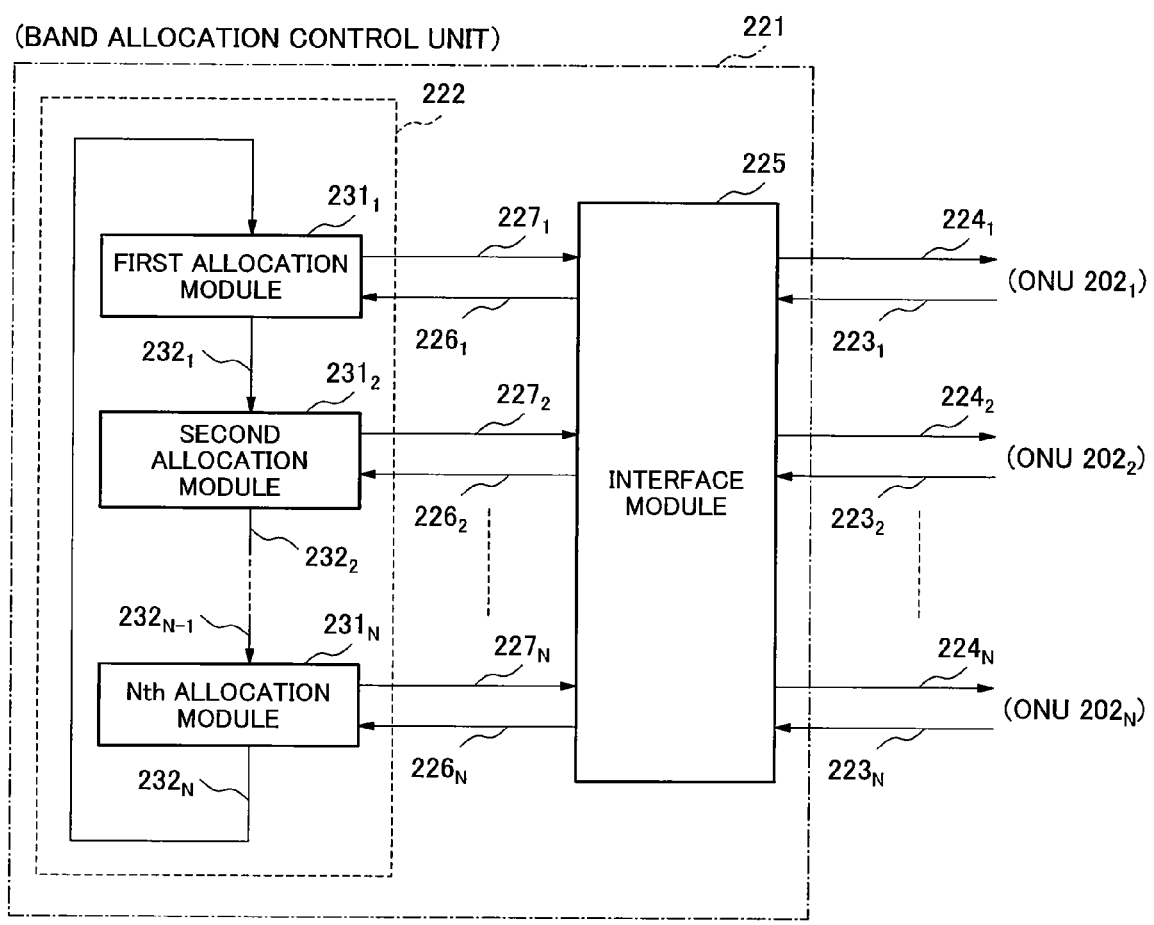
FIG. 2 is a block diagram illustrating a configuration of a bandwidth allocation control unit in the embodiment.

FIG. 2 illustrates a configuration of a bandwidth allocation control unit in the present embodiment. A bandwidth allocation control unit 221 includes a group of allocation modules 222 that allocate bandwidth, an interface module 225 for transmitting/receiving output requests (REPORTs) $223_1$-$223_N$ and signal sending permissions (GATEs) $224_1$-$224_N$ to/from the first to Nth ONUs $202_1$-$202_N$. The bandwidth allocation control unit 221 includes a CPU (Central Processing Unit) (not shown), storage media such as a ROM (Reed Only Memory) that store control programs, and a working memory such as a RAM (Random Access Memory) for temporality storing various types of data when the CPU executes the control programs. Some or all of the above components can be replaced with hardware.

The interface module 225 receives the states of queues, i.e. lengths of the queues in said buffer memory for storing signals to be transmitted by the first to Nth ONUs $202_1$-$202_N$, as output requests $223_1$-$223_N$ respectively. When the group of allocation modules 222 allocates bandwidth, the interface module 225 transmits the result as signal sending permissions $224_1$-$224_N$ to the first to Nth ONUs $202_1$-$202_N$. This operation is similar to that of the conventional interface module 125 shown in FIG. 15.

A first to Nth allocation modules $231_1$-$231_N$ connect to one another in a ring, and perform serial distributed processing to allocate bandwidth in a distributed manner in each allocation module and output allocation complete signals 227 to the interface module 225. For example, in case of processing that begins at the first allocation module $231_1$ and completes the allocation in one cycle at the last Nth allocation module $231_N$, when the first allocation module $231_1$ completes the allocation processing in the allocation module based on a queue state signal $226_1$ received from a first ONU $202_1$, it outputs an allocation result signal $232_1$ being a temporary allocation result to the second allocation module $231_2$ connected to it. The details are described below. The second allocation module $231_2$ performs the allocation processing based on a queue state signal $226_2$ received from the second ONU $202_2$ and an allocation result signal $232_1$ supplied from the first allocation module $231_1$, and outputs an allocation result signal $232_2$ being the temporary allocation result to the third allocation module $231_3$. In the following processing, the Nth allocation module $231_N$ similarly performs the allocation process based on the queue state signal $226_N$ received from an Nth ONU $202_N$ and an allocation result signal $232_{N-1}$ supplied from the (N−1)th allocation module $231_{N-1}$, then outputs the allocation complete signal $227_N$ to the interface module 225. In the next processing cycle, the processing starts at the second allocation module $231_2$, the allocation processing in one cycle completes at the first allocation module $231_1$ next to the Nth allocation module $231_N$. In this case, the first allocation module $231_1$ outputs the allocation complete signal $227_1$ to the interface module 225. In this way, according to the present invention, the allocation processing in each cycle is executed in the first to Nth allocation modules $231_1$-$231_N$, allocation modules other than the last stage supply the result of the allocation in the allocation module as an allocation result signal being temporary allocation result to the next allocation module, and the allocation processing unit of the last stage outputs the allocation complete signal 227 as information that the allocation in the cycle has been completed to the interface module 225. The allocation module as the initial stage for starting processing in each cycle is set by sequential shifting.

Next, the bandwidth allocation in the group of allocation modules 222 is described in detail. For simplicity, the number N of ONUs constituting a system is three, and bandwidth allocation control for the first to third ONUs $202_1$-$202_3$ is described. A cycle of data transmission by the first to third ONUs $202_1$-$202_3$ is referred to as a service cycle SC. In the present embodiment, bandwidth allocation in the third service cycle SC is executed in advance during the current service cycle SC. This allocation in the third service cycle allows enough time for the processing.

Figure 3:
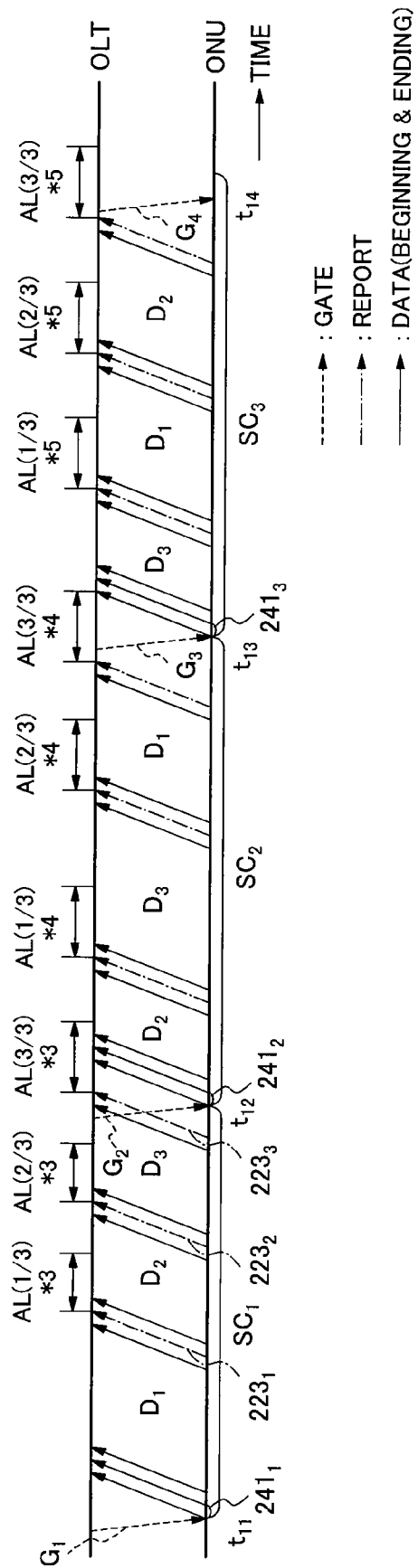
FIG. 3 is a timing diagram illustrating a way that three ONUs communicate with an OLT in the embodiment.

FIG. 3 illustrates a way that three ONUs communicate with an OLT in the present embodiment. As already described, data processed by the first to third ONUs $202_1$-$202_3$ is classified into three classes depending on the priorities. These classes of data include EF (Expedited Forwarding) data for guaranteeing a delay and a bandwidth, AF (Assured Forwarding) data for not guaranteeing a delay but guaranteeing a bandwidth, and BE (Best Effort) data for not guaranteeing a delay or a bandwidth. Headers of service cycles $SC_1$, $SC_2$, $SC_3$ . . . include time slots $241_1$, $241_2$, $241_3$ . . . for the highest-priority EF data, respectively. Since the EF data is assigned the highest priority with being guaranteed a delay and a bandwidth, the bandwidth allocation is not controlled for the EF data. The bandwidth allocation is controlled for data of the AF class and the BE class. Prior to each of the service cycles $SC_1$, $SC_2$, and $SC_3$, the signal sending permissions $224_1$-$224_3$ ($G_1$, $G_2$, and $G_3$) are sent from the OLT 201 to the first to third ONUs $202_1$-$202_3$ at times $t_{11}$, $t_{12}$, and $t_{13}$.

For example, the first service cycle $SC_1$ is assigned a time slot $241_1$ for the EF data first. Then, data $D_1$ of the AF class and the BE class based on a request by the first ONU $202_1$ is transmitted to the OLT 201. After the transmission, the output request (REPORT) $223_1$ is transmitted from the first ONU $202_1$ to the OLT 201 piggyback at the end of the data $D_1$. Then, data $D_2$ of the AF class and the BE class based on a request by the second ONU $202_2$ is transmitted to the OLT 201. After the transmission, an output request $223_2$ is transmitted from the second ONU $202_2$ to the OLT 201 piggyback at the end of the data $D_2$. Then, data $D_3$ of the AF class and the BE class based on a request by the third ONU $202_3$ is transmitted to the OLT 201. After the transmission, the output request $223_3$ is transmitted from the third ONU $202_3$ to the OLT 201 piggyback at the end of the data $D_3$.

The above transmission also applies to the second service cycle $SC_2$ and the third service cycle $SC_3$. However, the data $D_1$, $D_2$, and $D_3$ of the first to third ONUs $202_1$-$202_3$ in respective service cycle SCs are not always transmitted in that order. For example, the data $D_2$, $D_3$, and $D_1$ are transmitted in that order after the time slot $241_1$ for the EF data in the second service cycle $SC_2$. Similarly, the data $D_3$, $D_1$, and $D_2$ are transmitted in that order after the time slot $241_3$ for the EF data in the third service cycle $SC_3$. This transmission, being set by shifting an allocation module for starting the processing in a cyclic manner for each service cycle, as described below. This setting provides equalized allocation among the ONUs.

Figure 4:
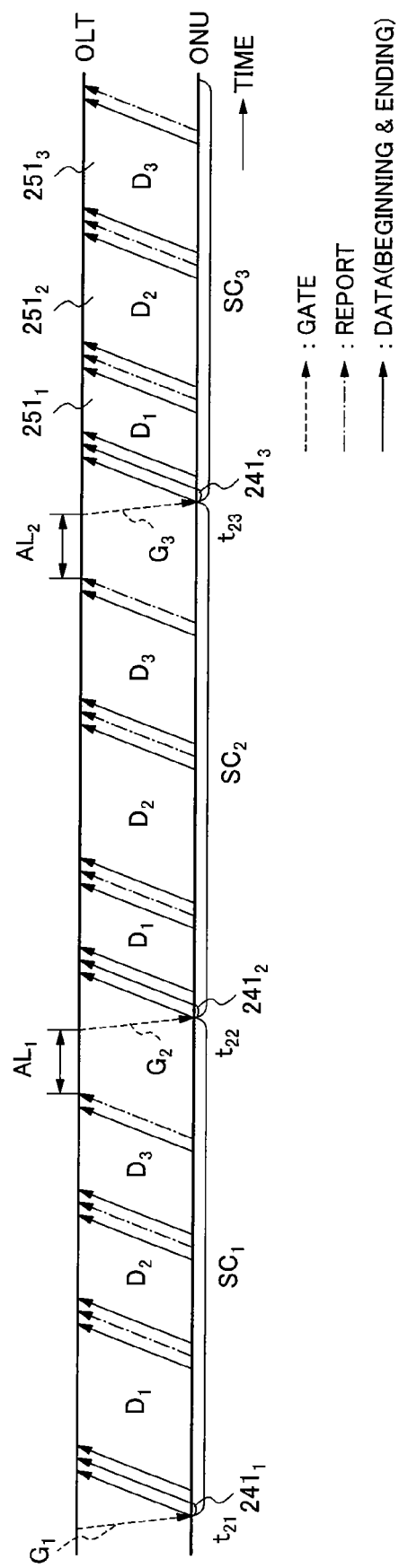
FIG. 4 is a timing diagram illustrating a conventional way that three ONUs communicate with an OLT in contrast to the embodiment.

FIG. 4 illustrates how three ONUs communicate with an OLT in a related art in contrast to the present embodiment. FIG. 4 is identical to FIG. 3 in that the time slots $241_1$, $241_2$, and $241_3$ for the highest-priority EF data are located in the headers of the respective service cycles $SC_1$, $SC_2$, and $SC_3$. FIG. 4 is identical to FIG. 3 also in that prior to the respective service cycles $SC_1$, $SC_2$, and $SC_3$, at times $t_{21}$, $t_{22}$, and $t_{23}$, the signal sending permissions 124 ($G_1$, $G_2$, and $G_3$) are sent from the OLT 101 (see FIG. 11) to the first to third ONUs $102_1$-$102_3$ (also see FIG. 11).

However, according to the related art shown in FIG. 4, the data $D_1$, $D_2$, and $D_3$ of the first to third ONUs $102_1$-$102_3$ in the respective service cycles $SC_1$, $SC_2$, and $SC_3$ are transmitted in that order. Additionally, after the last data $D_3$ is sent to the OLT 101 and the output request (REPORT) $123_3$ by the third ONU $102_3$ is sent to the OLT 101 piggyback, relatively longtime traffic allocations $AL_1$ and $AL_2$ are assigned. As a result, according to the related art shown in FIG. 4, an amount of data $D_1$, $D_2$, and $D_3$, which can be transmitted to the OLT 101 in a time period of predetermined time length is small. The data transmission according to the embodiment of the present invention is more efficient.

The description is continued with referring back to FIG. 3. Also in the present embodiment, the length of each of the service cycles $SC_1$, $SC_2$, and $SC_3$ does not need to be always constant. However, Maximum of Service Cycle is determined in advance for each service cycle SC and the allocation is performed so that a requested signal does not exceed the Maximum of Service Cycle. In the present embodiment, while the interface module 225 shown in FIG. 2 is performing the signal sending permissions $224_1$-$224_3$ for the allocation in the service cycle $SC_1$, the first to third allocation modules $231_1$-$231_3$ perform the allocation processing in the third service cycle $SC_3$. This allows enough time for the bandwidth allocation processing. As a result, the traffic allocations AL shown in FIG. 4 do not appear as intervals during which the data D cannot be transmitted, in the present embodiment.

In the present embodiment, the first allocation module 231 shown in FIG. 2 receives the queue state signal $226_1$ based on a request by the first ONU $202_1$. When the requested amount of data falls within the range of the Maximum of Service Cycle for the service cycle $SC_3$, the first allocation module $231_1$ allocates a bandwidth to the data $D_1$ ($251_1$ in FIG. 4) of the AF class and the BE class requested. The first allocation module $231_1$ passes an allocation result signal $232_1$ to the second allocation module $231_2$. An expression of AL(1/3)*3 shown in FIG. 3 indicates time for the above operation.

The queue state signal $226_2$ based on a request by the second ONU $202_2$ and the allocation result signal $232_1$ sent from the first allocation module $231_1$ are input to the second allocation module $231_2$. If the requested amount of data falls within the range of the Maximum of Service Cycle for the service cycle $SC_3$, the data $D_2$ ($251_2$ in FIG. 4) of the AF class and the BE class as requested is allocated to a bandwidth. Then, the second allocation module $231_2$ passes an allocation result signal $232_2$ to the third allocation module $231_3$. An expression of AL(2/3)*3 shown in FIG. 3 indicates time for the above operation.

A requested amount of data may not fall within the range of the Maximum of Service Cycle for the service cycle $SC_3$, when bandwidth is allocated. In this case, the second allocation module $231_2$ performs the allocation by considering the result of the bandwidth allocation by the first allocation module $231_1$ and the priorities of the classes. The allocation priority is expressed in the following equation (1):

$$\text{AF(the first ONU } 202_1) > \text{AF(the second ONU } 202_2) \\ > \text{BE(the first ONU } 202_1) > \text{BE(the second ONU } 202_2) \qquad (1)$$

That is, the AF data for the first ONU $202_1$ is not changed, since a bandwidth of the AF data for the first ONU $202_1$ is first allocated by priority in a bandwidth obtained by subtracting the time slot 241 for the EF data from the Maximum of Service Cycle for the service cycle. Since the priority of the AF data for the second ONU $202_2$ is higher than the BE data for the first ONU $202_1$, when the AF data for the second ONU $202_2$ is allocated in remaining bandwidth and further remaining bandwidth is small, a bandwidth of the BE data for the first ONU $202_1$ may be reduced by the AF data for the second ONU $202_2$. If a bandwidth of the Maximum of Service Cycle for the service cycle is exceeded when the AF data for the first and second ONUs $202_1$ and $202_2$ is allocated, the BE data for the first and second ONUs $202_1$ and $202_2$ is not allocated a bandwidth.

If the total bandwidth to be allocated to the AF data for the first and second ONUs $202_1$ and $202_2$ exceeds the Maximum of Service Cycle, the AF data for the first ONU $202_1$ is allocated a bandwidth as required, while the AF data for the second ONU $202_2$ is allocated the remaining bandwidth within the range of the Maximum of Service Cycle. As described above, the priority of the bandwidth allocation among the first to third ONUs $202_1$-$202_3$ varies depending on the service cycles SC. Unlike the conventional embodiment shown in FIG. 4, there is no need to equalize the bandwidth allocation among the respective service cycles SC.

When the above processing for the bandwidth allocation finishes, the second allocation module $231_2$ passes the allocation result signal $232_2$ to the third allocation module $231_3$.

The queue state signal $226_3$ based on a request by the third ONU $202_2$ and the allocation result signal $232_2$ sent from the second allocation module $231_2$ are input to the third allocation module $231_3$. If the requested amount of data falls within the range of the Maximum of Service Cycle for the service cycle $SC_3$, the data $D_3$ ($251_3$ in FIG. 4) of the AF class and the BE class is allocated to a bandwidth as requested. Then, the third allocation module $231_3$ passes an allocation result signal $232_3$ to a first allocation module $231_1$. An expression of AL(3/3)*3 shown in FIG. 3 indicates time for the above operation.

A requested amount of data may not fall within the range of the Maximum of Service Cycle for the service cycle $SC_3$ when bandwidth is allocated. In this case, the third allocation module $231_3$ performs the allocation by considering the result of the bandwidth allocation by the first and second allocation modules $231_1$ and $231_2$ and the priorities of the classes. The allocation priority is expressed in the following equation (2):

$$\text{AF(the first ONU } 202_1) > \text{AF(the second ONU } 202_2) \\ > \text{AF(the third ONU } 202_3) > \text{BE(the first ONU } 202_1) > \text{BE(the second ONU } 202_2) > \text{BE(the third ONU } 202_3) \qquad (2)$$

That is, also in this case, the AF data for the first to third ONUs $202_1$-$202_3$ is simply allocated within the range of the Maximum of Service Cycle considering the priority shown in the equation (2). When the above processing finishes, the third allocation module $231_3$ outputs the allocation complete signal $227_3$ to the interface module 225. The interface module 225 detects through the allocation complete signal $227_3$ that the first to third ONUs $202_1$-$202_3$ have completed all the bandwidth allocation. At this time, the interface module 225 outputs the signal sending permissions $224_1$-$224_3$ to the first to third ONUs $202_1$-$202_3$, respectively. FIG. 3 shows the signal sending permissions $224_1$-$224_3$ as the signal sending permission $G_3$ at a time close to the end of the second service cycle $SC_2$.

Figure 5:
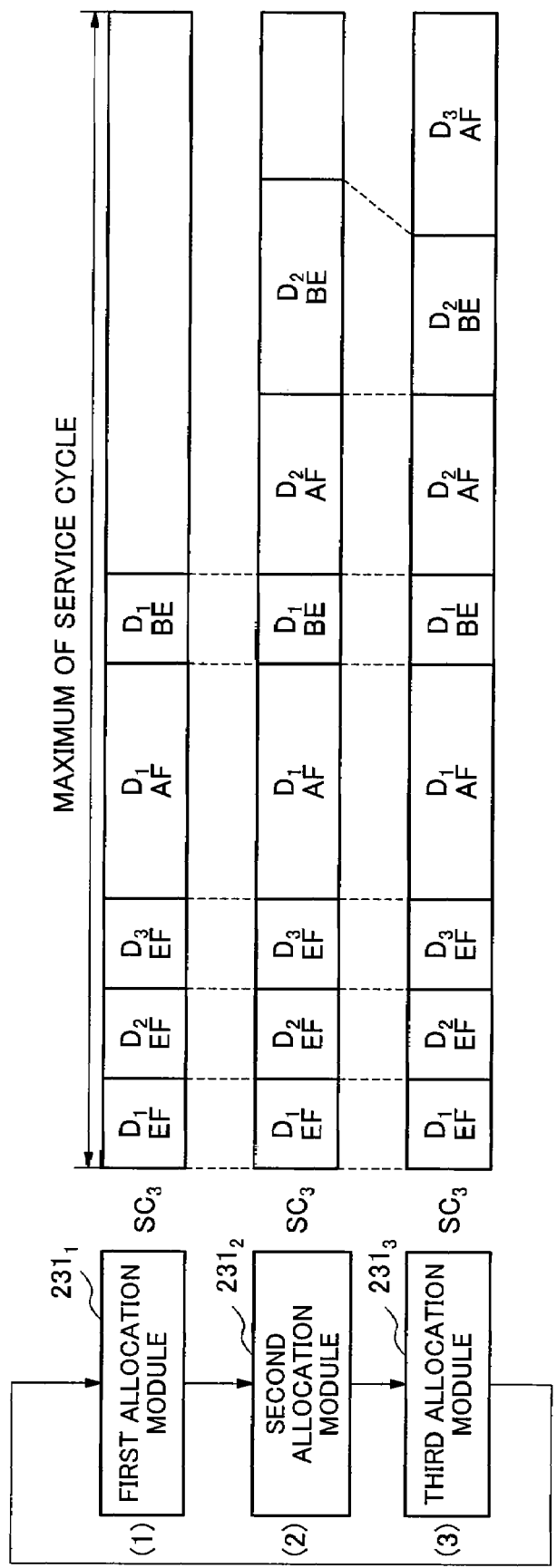
FIG. 5 is a diagram illustrating transition of bandwidth allocation by each allocation module in bandwidth allocation control in a service cycle $SC_3$ in the embodiment.

FIG. 5 illustrates transition of bandwidth allocation by each allocation module in bandwidth allocation control for the service cycle $SC_3$. The bracketed numbers (1) to (3) attached to the first to third allocation modules $231_1$-$231_3$ indicate the order of the bandwidth allocation. In this example, all the data $D_1$ and $D_2$ acquire bandwidth till the bandwidth allocation stage by the second allocation module $231_2$ without restriction. At the bandwidth allocation stage by the third allocation module $231_3$ in order to keep the AF data for the data $D_3$ within the Maximum of Service Cycle, assignment of the BE data for the data $D_2$ of lower priority is reduced.

When the bandwidth allocation control in the service cycle $SC_3$ ends as described above, the bandwidth allocation control for the service cycle $SC_4$ starts. At the start time, the interface module 225 shown in FIG. 2 sets the second allocation module $231_2$ to a start position of the bandwidth allocation. Then, it allocates data of the AF class and the BE class within the range of the Maximum of Service Cycle. The third allocation module $231_3$ that performs the second allocation performs the allocation by considering the result of the bandwidth allocation by the second allocation modules $231_2$ and the priorities of the classes. The allocation priority is expressed in the following equation (3):

$$\text{AF(the second ONU } 202_2) > \text{AF(the third ONU } 202_3) \\ > \text{BE(the second ONU } 202_2) > \text{BE(the third ONU } 202_3) \qquad (3)$$

Finally, the first allocation module $231_1$ performs the allocation by considering the result of the bandwidth allocation by the second and third allocation modules $231_2$ and $231_3$ and the priorities of the classes. The allocation priority is expressed in the following equation (4):

$$\text{AF(the second ONU } 202_2) > \text{AF(the third ONU } 202_3) \\ > \text{AF(the first ONU } 202_1) > \text{BE(the second ONU } 202_2) > \text{BE(the third ONU } 202_3) > \text{BE(the first ONU } 202_1) \qquad (4)$$

When the above processing ends, the first allocation module $231_1$ outputs the allocation complete signal $227_1$ to the interface module 225. The interface module 225 detects through the allocation complete signal $227_1$ that all the bandwidth allocation for the first to third ONUs $202_1$-$202_3$ have been completed. At this time, the interface module 225 outputs the signal sending permissions $224_1$-$224_3$ to the first to third ONUs $202_1$-$202_3$, respectively.

Figure 6:
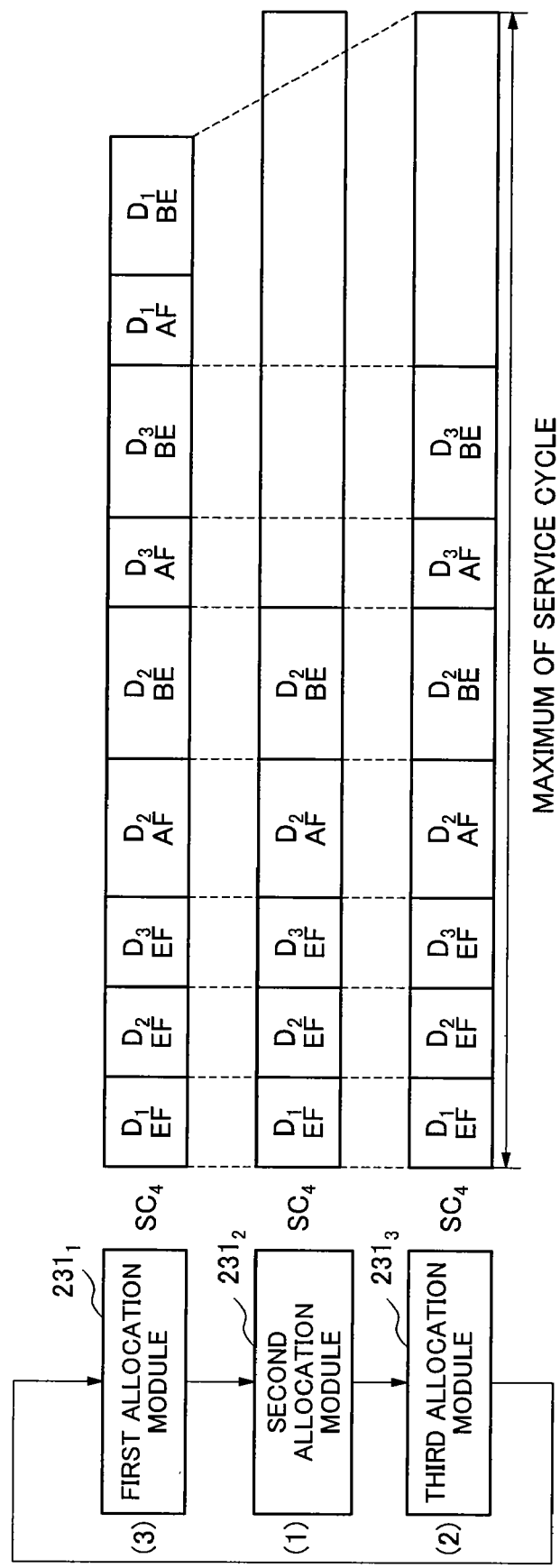
FIG. 6 is a diagram illustrating transition of bandwidth allocation by each allocation module in bandwidth allocation control in a service cycle $SC_4$ in the embodiment.

FIG. 6 illustrates transition of bandwidth allocation by each allocation module in bandwidth allocation control in the service cycle $SC_4$. The bracketed numbers (1) to (3) attached to the first to third allocation modules $231_1$-$231_3$ indicate the order of the bandwidth allocation. In this example, all the data $D_1$-$D_3$ are allocated bandwidth without restriction since the requested amount of data does not exceed the Maximum of Service Cycle even at the last bandwidth allocation stage by the first allocation module $231_1$.

When the bandwidth allocation control in the service cycle $SC_4$ ends as described above, the bandwidth allocation control for the service cycle $SC_5$ starts. At the start time, the interface module 225 shown in FIG. 2 sets the third allocation module $231_3$ to a start position of the bandwidth allocation. Then, it allocates data of the AF class and the BE class within the range of the Maximum of Service Cycle. The first allocation module $231_1$ that performs the second allocation performs the allocation by considering the result of the bandwidth allocation by the third allocation modules $231_3$ and the priorities of the classes. The allocation priority is expressed in the following equation (5):

AF(the third ONU $202_3$)>AF(the first ONU $202_1$)>BE (the third ONU $202_3$)>BE(the first ONU $202_1$)     (5)

Finally, the second allocation module $231_2$ performs the allocation by considering the result of the bandwidth allocation by the third and first allocation modules $231_3$ and $231_1$ and the priorities of the classes. The allocation priority is expressed in the following equation (6):

AF(the third ONU $202_3$)>AF(the first ONU $202_1$>AF (the second ONU $202_2$)>BE(the third ONU $202_3$)>BE(the first ONU $202_1$)>BE(the second ONU $202_2$)     (6)

When the above processing of the bandwidth allocation ends, the second allocation module $231_2$ outputs the allocation complete signal $227_2$ to the interface module 225. The interface module 225 detects through the allocation complete signal $227_2$ that all the bandwidth allocation for the first to third ONUs $202_1$-$202_3$ have been completed. At this time, the interface module 225 outputs the signal sending permissions $224_1$-$224_3$ to the first to third ONUs $202_1$-$202_3$, respectively.

Figure 7:
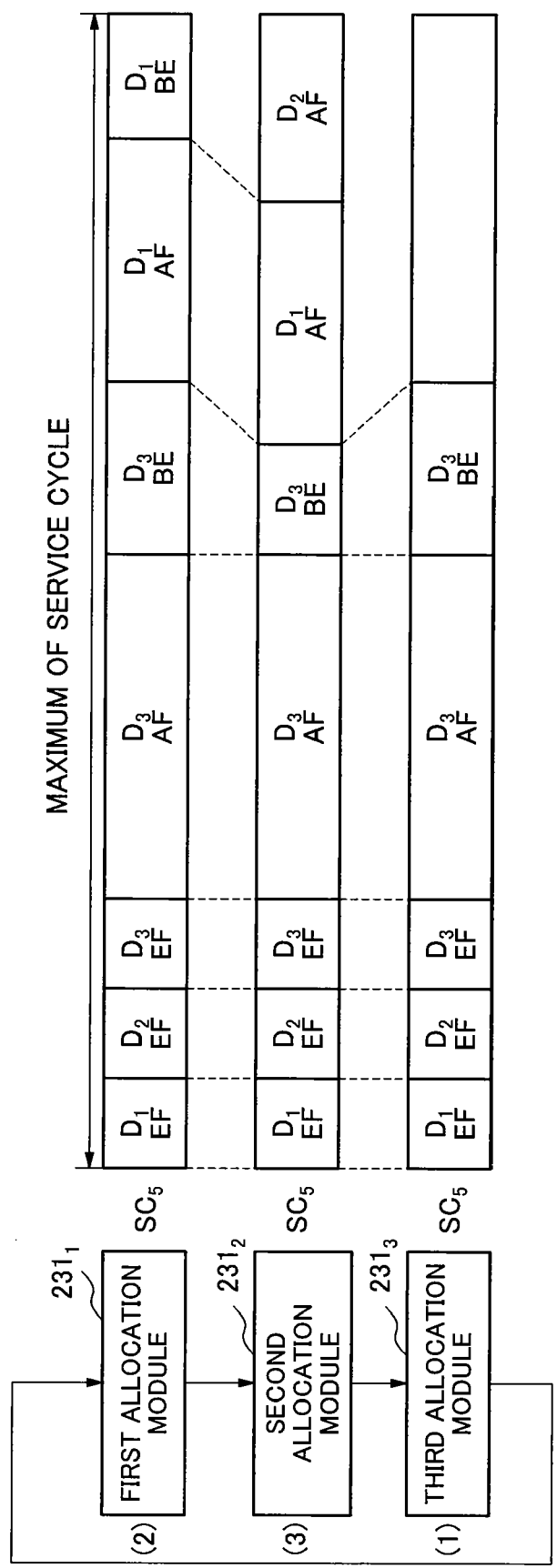
FIG. 7 is a diagram illustrating transition of bandwidth allocation by each allocation module in bandwidth allocation control in a service cycle $SC_5$ in the embodiment.

FIG. 7 illustrates transition of bandwidth allocation by each allocation module in bandwidth allocation control in the service cycle $SC_5$. The bracketed numbers (1) to (3) attached to the first to third allocation modules $231_1$-$231_3$ indicate the order of the bandwidth allocation. In this example, assignment of the BE data for the low-priority data $D_1$ is restricted since the Maximum of Service Cycle is exceeded at the second stage by the first allocation module $231_1$. At the last stage of the bandwidth allocation by the second allocation module $231_2$, the allocation is performed completely for the AF data of higher priority than the BE data. Accordingly, only BE data of the highest-priority data $D_3$ in the BE data is allocated bandwidth with a limit satisfying the Maximum of Service Cycle. The bandwidth of the BE data of the $D_1$ is used as bandwidth allocated to the AF data of the $D_2$.

Figure 8:
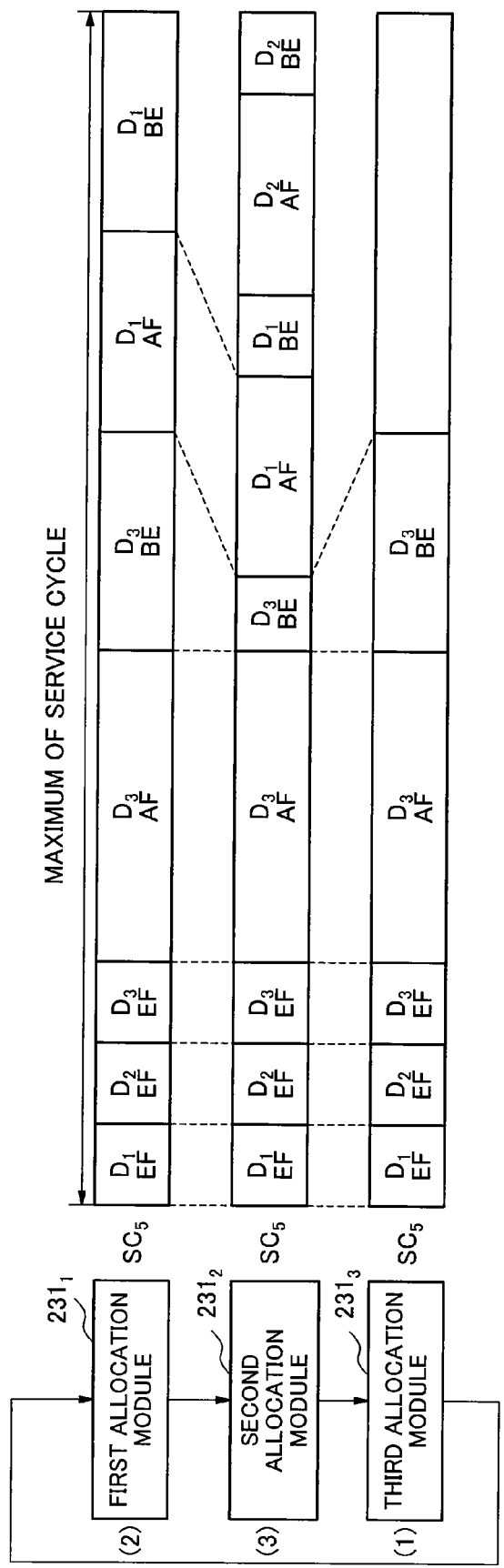
FIG. 8 is another example of diagram illustrating transition of bandwidth allocation in a service cycle $SC_5$ in the embodiment.

In FIG. 7, to allocate the bandwidth of the AF data of the $D_2$, allocated bandwidth of the BE data of the $D_1$ is replaced for bandwidth to be allocated to the AF data of the $D_2$. The BE data of the $D_2$ is not allocated, and only BE data of the $D_3$ is allocated with restriction. The allocation restriction method is not limited to the above, but bandwidth permitted for the BE data can be allocated by equally restricting the BE data of the $D_1$-$D_3$. (See FIG. 8.)

Figure 9:
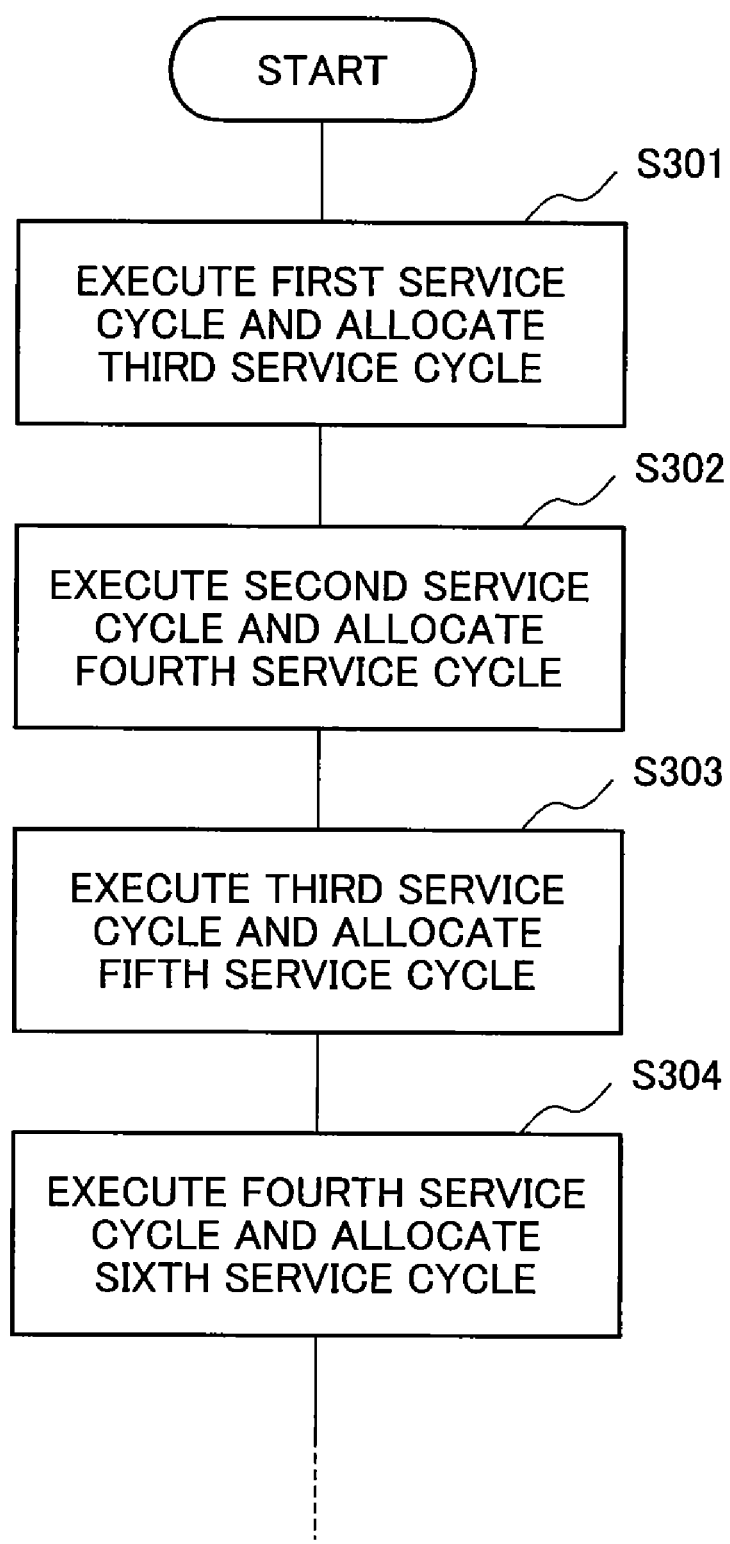
FIG. 9 is a flow diagram illustrating an overview of bandwidth allocation control unit in the embodiment.
Figure 12:
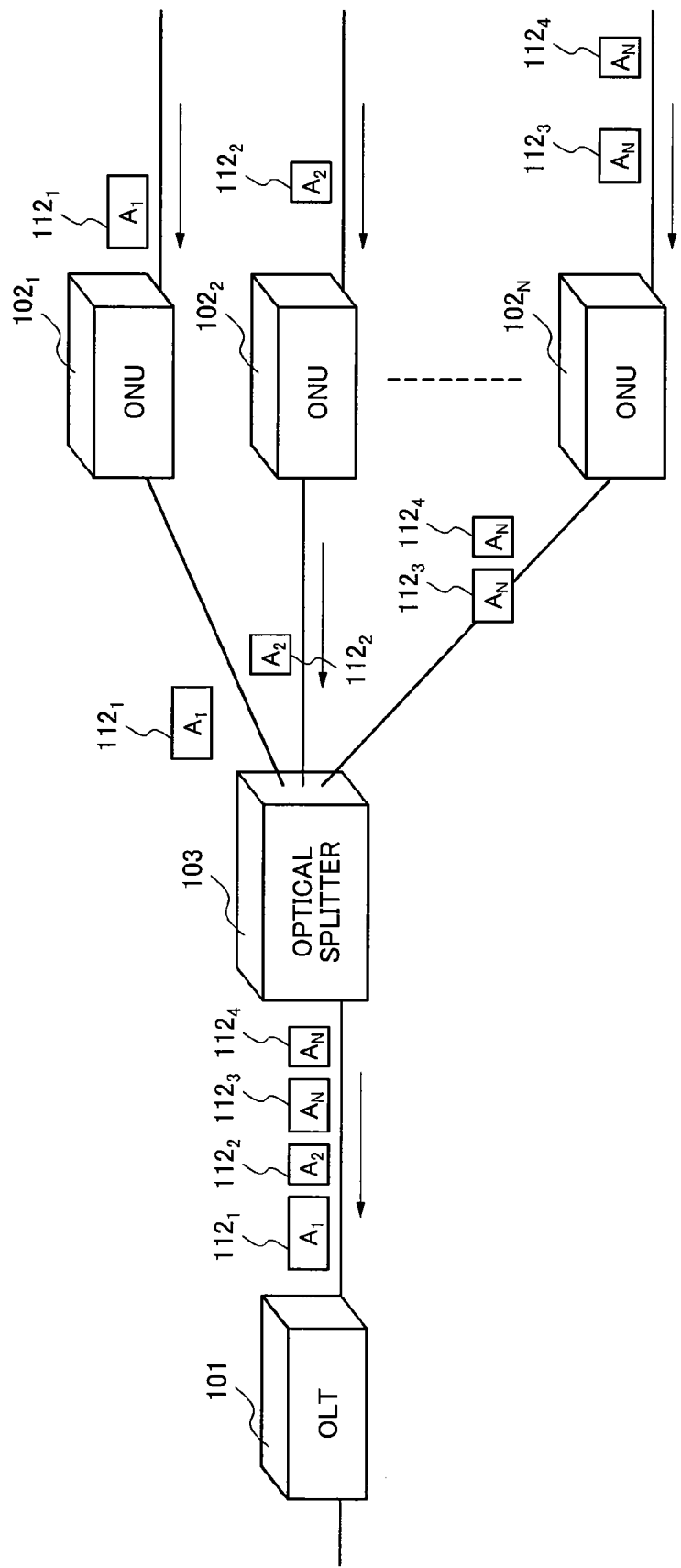
FIG. 12 is a diagram illustrating a PON configuration and upstream frame transmission.
Figure 13:
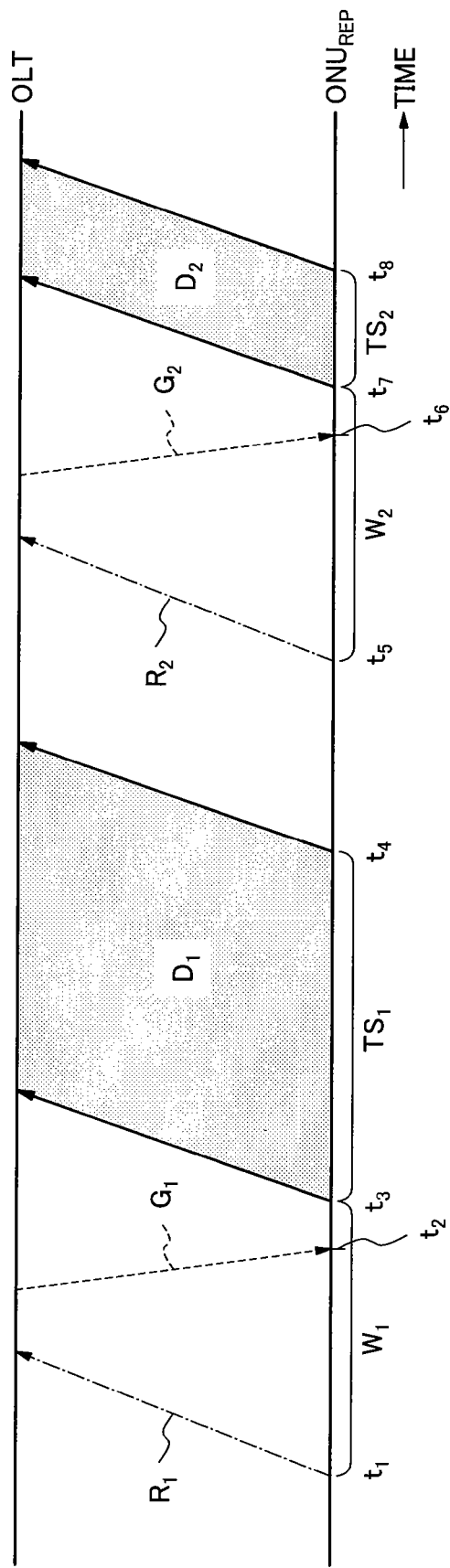
FIG. 13 is a diagram illustrating a conventional exchange of output requests and signal sending permissions to them.

FIG. 9 is a flow diagram illustrating an overview of bandwidth allocation control unit that performs the above described processing. In the processing, the first to Nth ONUs $202_1$-$202_N$ shown in FIG. 1 communicate with the OLT 201. At step S301, the bandwidth allocation control unit 221 accepts the output requests $223_1$-$223_N$ in the first service cycle $SC_1$. The signal sending permissions $224_1$-$224_N$ are granted to the output requests $223_1$-$223_N$, according to the conventional approach described in FIG. 12 or FIG. 13. The permitted data of the data $D_1$-$D_N$ of the first to Nth. ONUs $202_1$-$202_N$ are transmitted the OLT 201. The bandwidth allocation control unit 221 controls the bandwidth allocation for the third service cycle $SC_3$ in advance.

Figure 14:
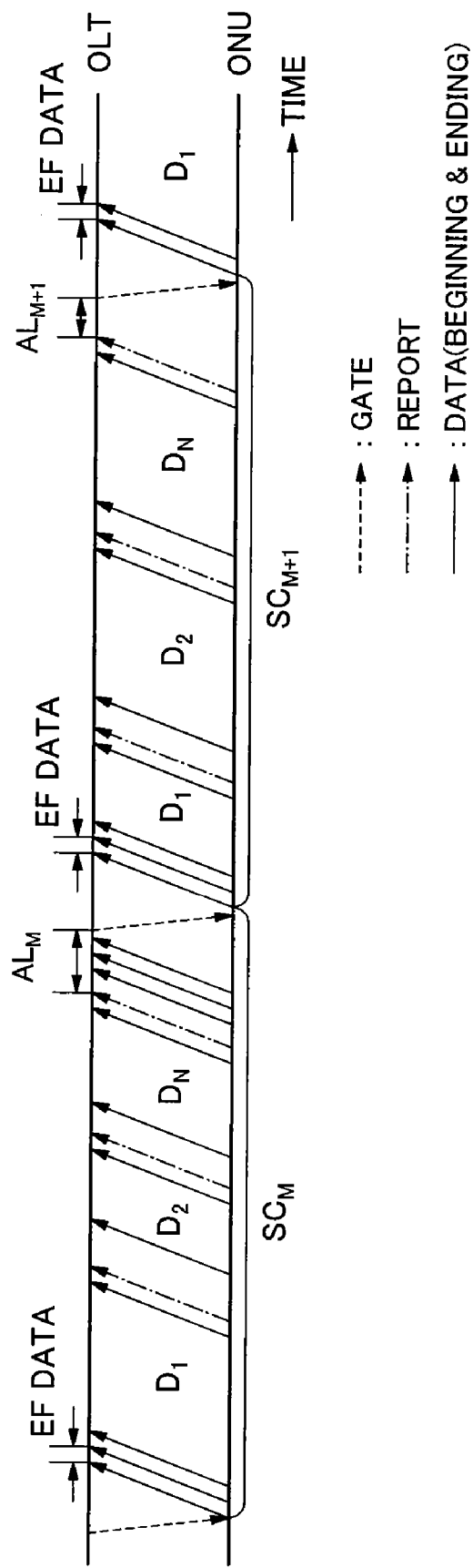
FIG. 14 is a diagram illustrating a conventional way that three ONUs communicate with an OLT.

To relieve the processing in the first service cycle $SC_1$, in the present embodiment, for the first service cycle $SC_1$, the bandwidth allocation control unit 221 receives the output requests $223_1$-$223_N$, makes the ONUs $202_1$-$202_N$ to transmit data only of the EF class for guaranteeing a delay and a bandwidth, or makes the ONUs $202_1$-$202_N$ to transmit data containing bandwidth of the AF class and the EF class. Accordingly, the output requests $223_1$-$223_N$, which contain mainly the BE class not transmitted in the first service cycle $SC_1$, are allocated to the third service cycle $SC_3$. The next allocation for the second service cycle $SC_2$ can be performed by providing the traffic allocation AL shown in FIG. 14 in the last interval in the first service cycle $SC_1$.

At the next step S302 that executes the second service cycle $SC_2$, similarly to the first service cycle $SC_1$, the bandwidth allocation control unit 221 receives the output requests $223_1$-$223_N$, and makes the ONUs $202_1$-$202_N$ to transmit data only of the EF class, or makes the ONUs $202_1$-$202_N$ to transmit data containing bandwidth of the AF class and the EF class. Alternatively, based on the traffic allocation AL performed in the first service cycle $SC_1$, the bandwidth allocation control unit 221 makes the ONUs $202_1$-$202_N$ to transmit the data $D_1$-$D_N$ limited to the EF class and the AF class, and performs the allocation for the fourth service cycle $SC_4$. If there is enough time for the processing, the bandwidth allocation control unit 221 can make the ONUs $202_1$-$202_N$ to transmit all or some of the data $D_1$ to $D_N$ of the BE class data that requested by the output requests $223_1$-$223_N$.

At the next step S303 that executes the third service cycle $SC_3$, the bandwidth allocation control unit 221 makes the ONUs $202_1$-$202_N$ to transmit the data $D_1$ to $D_N$ allocated bandwidth at step S301, and executes the allocation for the fifth service cycle $SC_5$ in accordance with the output requests $223_1$-$223_N$ to be received from the first to Nth ONUs $202_1$-$202_N$. Similarly, at the next step S304 that executes the fourth service cycle $SC_4$, the bandwidth allocation control unit 221 makes the ONUs $202_1$-$202_N$ to transmit the data $D_1$ to $D_N$ allocated bandwidth at step S302, and executes the allocation for the sixth service cycle $SC_6$ in accordance with the output requests $223_1$-$223_N$ to be received from the first to Nth ONUs $202_1$-$202_N$. Subsequent allocations are performed in the same way as above.

Figure 10:
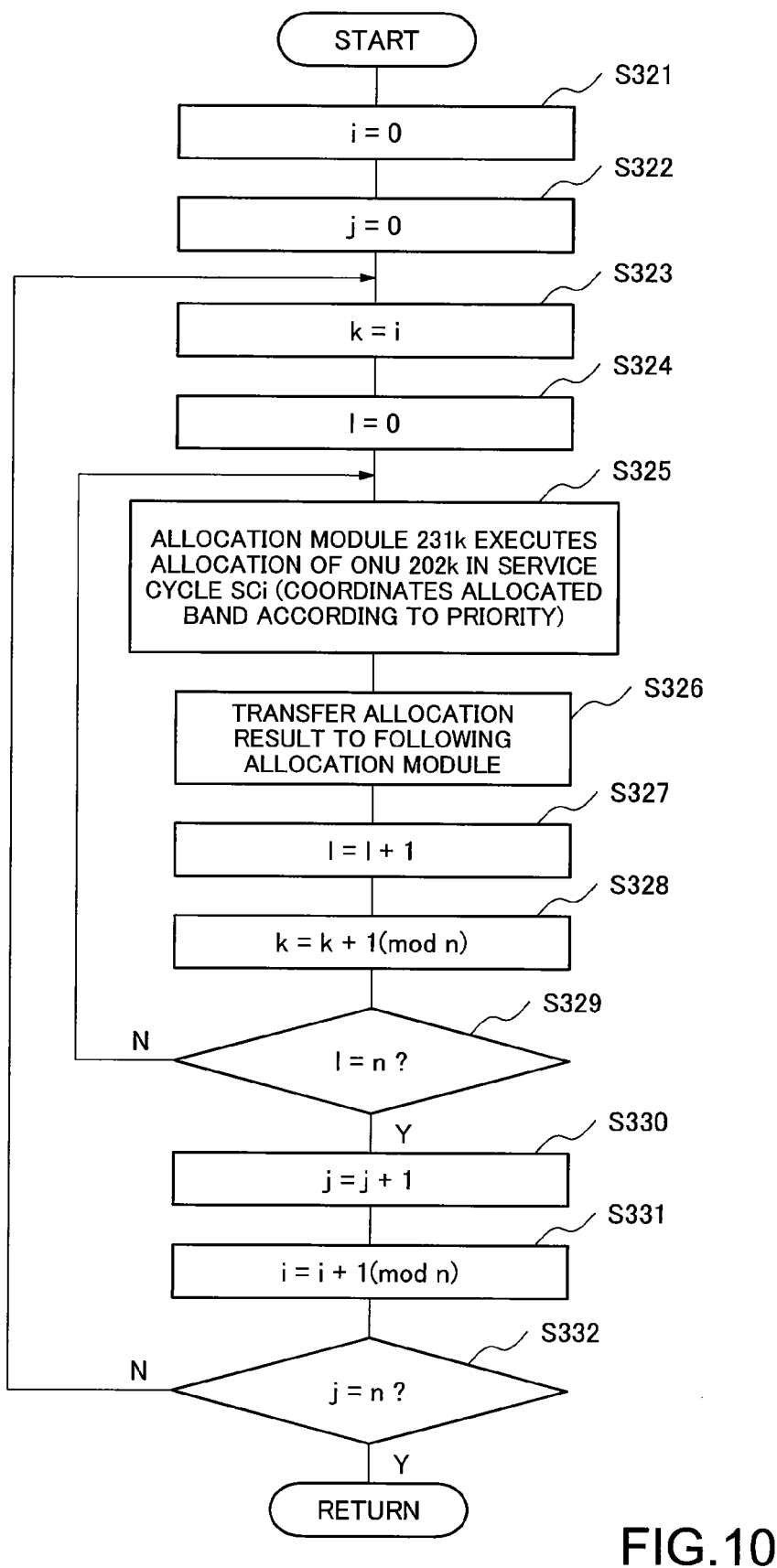
FIG. 10 is a flow diagram illustrating further specific control of bandwidth allocation control unit.

FIG. 10 illustrates the control of the bandwidth allocation control unit in detail. In the diagram, the number of the ONU 202 is n. Each ONU 201 is indexed by 0, 1, 2, ... and n−1. The service cycle SC is a cycle of 0 to n−1. First, the bandwidth allocation control unit 221 initializes a parameter i of the service cycle SC to 0 (step S321) before starting the processing, and initializes a parameter j to 0 (step S322). A parameter k of the allocation module 231 is set to the value (herein 0) of the parameter i (step S323), and a parameter l is initialized to 0 (step S324).

The allocation module $231_k$ (herein the allocation module $231_0$) of the bandwidth allocation control unit 221 performs allocation for an ONU $202_k$ (herein ONU $202_0$) in an ith service cycle $SC_i$ (herein service cycle $SC_0$) (step S325). That is, the first allocation module $231_1$ allocates the first bandwidth depending on the priority, as shown by (1) in FIG. 5 in the above example.

When the ONU $202_k$ is allocated in this way, the allocation result is forwarded to the following allocation module $231_{k+1}$ (step S326). Next, the parameter l is incremented by one (step S327) and the parameter k is incremented by one (step S328). The value of the parameter k cycles within the number of the ONUs 202, i.e. n. That is, k is a residue system of n.

Next, it is checked whether the parameter l reaches to n (step S329). Each ONU 202 is allocated bandwidth depending the priority by going back to step S325 till all bandwidth of n of ONUs 202 are allocated (step 329: N). If the parameter l equals to n (step S329: Y), the parameter j is incremented by one (step S330) and the parameter i is incremented by one (step S331). The value of the parameter i cycles within the limit, the number of the ONUs 202, n, Finally, it is checked whether the parameter j reaches to n (step S332). If j is different from n (step 332: N), the processing continues similarly by going back to step S323. If the parameter j equals to n (step S332: Y), the processing goes back to step S321 (return).

Now, the present embodiment is compared with the conventional approach to allocate bandwidth after receiving the output requests (REPORTs) from all the ONUs 202 under control of the OLT 201. According to the present embodiment, the output request from the ONU 202 are received in sequence and the bandwidth allocation processing is performed in two service cycles ahead, so that special time does not need to be set for allocation, and service cycles after the third service cycle does not waste bandwidth. Additionally, since the bandwidth allocation order changes in a cyclic manner, the bandwidth allocation processing is simplified and equalization among the ONUs 202 is ensured. Furthermore, according to the present embodiment, the distributed processing by each ONU allows sufficient time for processing, and the control unit is not assigned excessive loads if the number of the ONUs increases. The present example has an advantage that the processing speed is high enough, and an inexpensive circuit element or CPU can constitute the control unit, whereby saving the system cost.

Although the bandwidth allocation is processed by classifying the priorities to three classes of EF, AF and BE in the above described embodiment, the priority classification criteria or the number of the classes should not be limited to the embodiment. For example, it is possible to classify the AF into first relatively high-priority AF and second relatively low-priority AF, and similarly classify the BE to first and second BEs. According to this example, the relation among the priorities service cycles to allocate bandwidth in the order of the second ONU, the third ONU, and the first ONU is shown in the following equation (7):

first AF(second ONU)>first AF(third ONU)>first AF(first ONU)>second AF(second ONU)>second AF(third ONU)>second AF(first ONU)>first BE(second ONU)>first BE(third ONU)>first BE(first ONU)>second BE(second ONU)>second BE(third ONU)>second BE(first ONU) (7)

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A bandwidth allocation equipment in an optical line terminal which allocates bandwidth for data to be transmitted from a plurality of optical network units through an optical splitter, said equipment comprising:

a transmit/receive unit that receives an output request for requesting bandwidth allocation to the data from the respective optical network units, and sends back a signal sending permission to the respective optical network units for specifying bandwidth to be allowed for transmitting the data in each service cycle as a unit period for the data transmission; and a plurality of bandwidth allocation units, each bandwidth allocation unit is provided with corresponding to the optical network unit for performing bandwidth allocation processing in accordance with the output request for the data to be transmitted from the corresponding optical network unit, and each of bandwidth allocation units are connected to one another in a ring to perform the bandwidth allocation processing one by one for corresponding optical network unit, and outputs the signal sending permission to the transmit/receive unit from the bandwidth allocation unit that has performed the last bandwidth allocation processing in the ring connection, wherein, said transmit/receive unit specifies the bandwidth allocation unit that performs the first bandwidth allocation processing by shifting the bandwidth allocation unit one by one for each of the service cycles.

2. The bandwidth allocation equipment according to claim 1, wherein said bandwidth allocation unit, other than those which performs the bandwidth allocation processing at first and at last in the ring connection, performs the bandwidth allocation processing by taking over bandwidth allocation result having been performed by preceding bandwidth allocation unit in conjunction with the output request of the corresponding optical network unit, and sends the bandwidth allocation result having been performed by own bandwidth allocation unit to succeeding bandwidth allocation unit in the ring connection.

3. The bandwidth allocation equipment according to claim 2, wherein said data to be transmitted from the optical network unit is classified into one of priorities for transmission, and said bandwidth allocation unit allocates bandwidth to each data in accordance with the priority.

4. The bandwidth allocation equipment in the optical line terminal according to claim 3, wherein said priorities are classified into a plurality of classes including a class for guaranteeing a delay and a bandwidth, and a class for not guaranteeing a delay or a bandwidth for data sent from said optical network unit to said transmit/receive unit.

5. The bandwidth allocation equipment according to claim 3, wherein said data handled by the bandwidth allocation unit which performs the bandwidth allocation processing in first in the ring connection has higher priority than the data having the same priority handled by the bandwidth allocation unit which performs the bandwidth allocation processing later in the ring connection.

6. The bandwidth allocation equipment according to claim 5, wherein
said bandwidth allocation unit allocates bandwidth by replacing the bandwidth for data having been allocated in the previous bandwidth allocation result by data of a higher-priority within a range of a maximum bandwidth allowed for the service cycle.

7. The bandwidth allocation equipment in the optical line terminal according to claim 3, wherein
said bandwidth allocation unit allocates equally each data of a class of the optical network unit to a class of a priority that can allocate some data to the maximum bandwidth allowed for a service cycle.

8. The bandwidth allocation equipment according to claim 2, wherein
said bandwidth allocation unit performs the bandwidth allocation processing for a service cycle at least two service cycle ahead of the service cycle that accepts said output request.

9. A bandwidth allocation method in an optical line terminal which allocates bandwidth for data to be transmitted from a plurality of optical network units through an optical splitter, said method comprising:
an output request receiving step that receives an output request for requesting bandwidth allocation to the data from the respective optical network units;
a bandwidth allocation processing step that performs bandwidth allocation by a plurality of bandwidth allocation units, each bandwidth allocation unit is provided with corresponding to the optical network unit for performing bandwidth allocation processing in accordance with the output request for the data to be transmitted from the corresponding optical network unit, and each of bandwidth allocation units are connected to one another in a ring to perform the bandwidth allocation processing one by one for corresponding optical network unit; and
a sending back step that sends back a signal sending permission, which has been output from the bandwidth allocation unit that has performed the last bandwidth allocation processing in the ring connection, to the respective optical network units for specifying bandwidth to be allowed for transmitting the data in each service cycle as a unit period for the data transmission,
wherein, said bandwidth allocation processing step includes a bandwidth allocation unit specifying step that specifies the bandwidth allocation unit to perform the first bandwidth allocation processing in the ring connection by shifting the bandwidth allocation unit one by one for each of the service cycles.

10. The bandwidth allocation method according to claim 9, wherein
said bandwidth allocation processing step includes a bandwidth allocation result taking over step to be performed by the bandwidth allocation unit, other than those which performs the bandwidth allocation processing at first and at last in the ring connection, that performs the bandwidth allocation processing by taking over bandwidth allocation result having been performed by preceding bandwidth allocation unit in conjunction with the output request of the corresponding optical network unit, and sends the bandwidth allocation result having been performed by own bandwidth allocation unit to succeeding bandwidth allocation unit in the ring connection.

11. The bandwidth allocation method according to claim 10, wherein
said data to be transmitted from the optical network unit is classified into one of priorities for transmission, and said bandwidth allocation unit allocates bandwidth to each data in accordance with the priority in said bandwidth allocation processing step.

12. The bandwidth allocation method according to claim 11, wherein
said bandwidth allocation processing step includes a bandwidth replacing step that replaces the bandwidth for data having been allocated in the previous bandwidth allocation result by data of a higher-priority within a range of a maximum bandwidth allowed for the service cycle.

13. The bandwidth allocation method according to claim 10, wherein
said bandwidth allocation processing step is performed for the bandwidth allocation for a service cycle at least two service cycle ahead of the service cycle that accepts said output request.

* * * * *